Nov. 20, 1951 R. M. SINGER 2,575,846
HANDY WAGON FOR TRANSPORTING HEAVY ARTICLES
Filed Aug. 20, 1947 2 SHEETS—SHEET 2
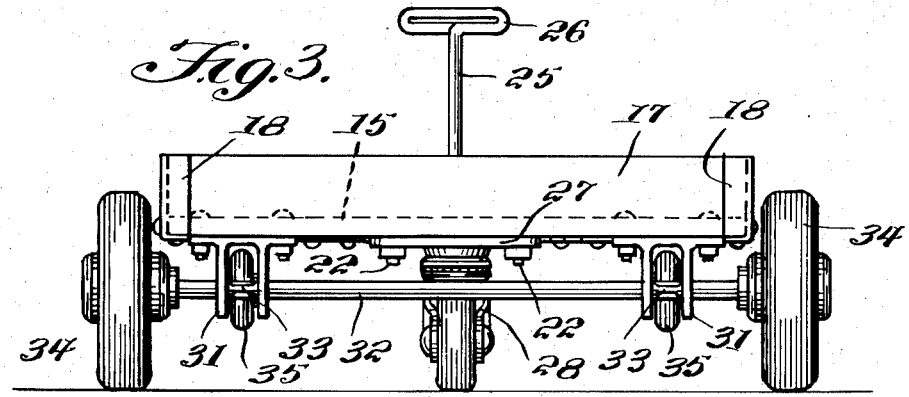
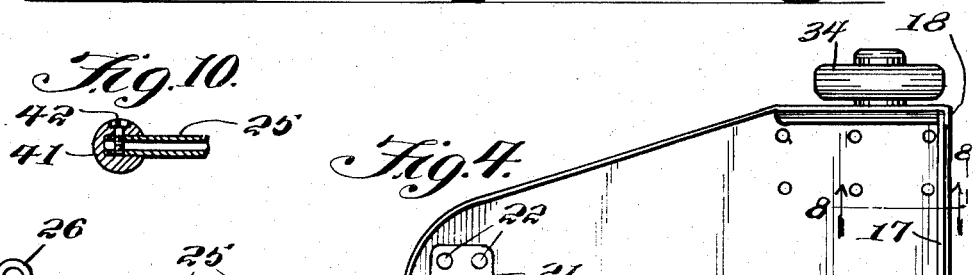
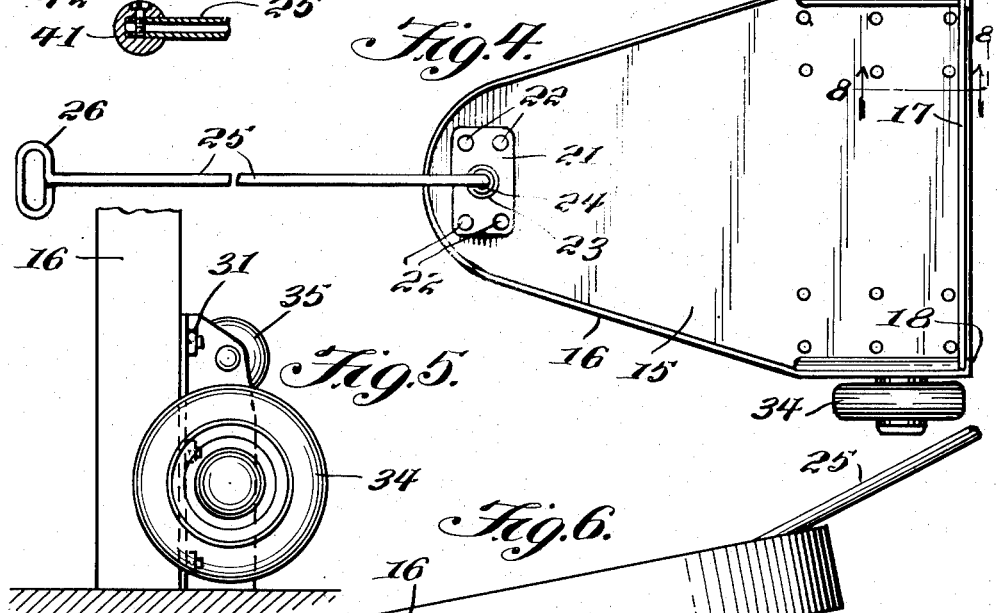
INVENTOR.
Rockie M. Singer;
BY Victor J. Evans & Co.
ATTORNEYS

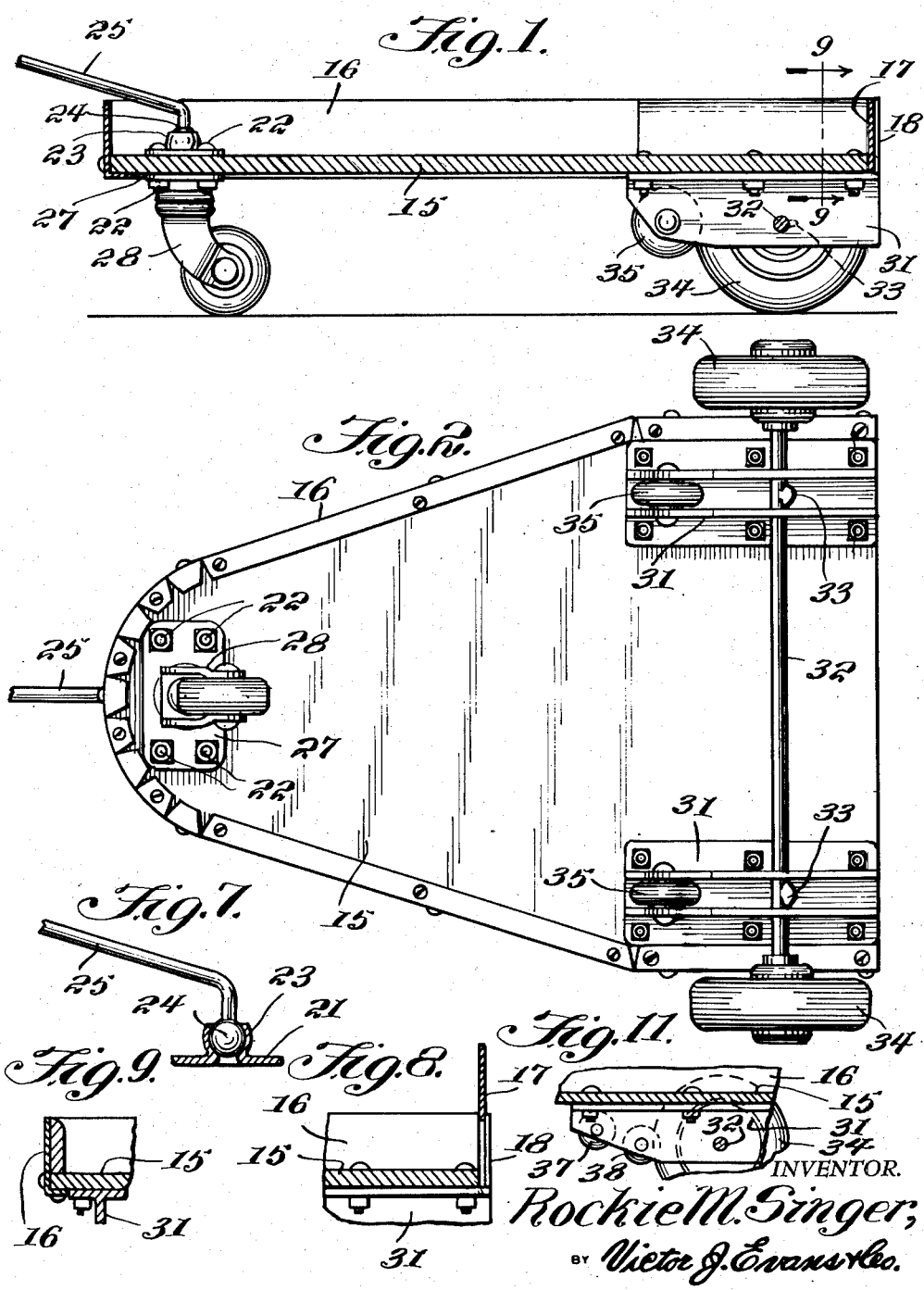

Patented Nov. 20, 1951

2,575,846

UNITED STATES PATENT OFFICE 2,575,846

HANDY WAGON FOR TRANSPORTING HEAVY ARTICLES

Rockie M. Singer, North Topeka, Kans.

Application August 20, 1947, Serial No. 769,617

2 Claims. (Cl. 280—5.24)

This invention relates to a handy wagon for transporting heavy articles.

It is an object of the present invention to provide a handy wagon adapted to support heavy articles and wherein the wheels thereof are arranged in tricycle fashion and wherein associated with the two rear wheels there are located small wheels raised and disposed forwardly of the larger rear wheels so as to contact with raised steps so as to facilitate and permit the handy wagon or dolly to be easily dragged upwardly over raised steps or the like.

Another object of the present invention is to provide in a handy wagon or dolly a simple construction for the attachment of a handle to the forward end of the same so that it can have universal movement in order that it can be readily extended to an out-of-the-way location or upwardly to accommodate itself to the user of the wagon.

Other objects of the present invention are to provide a handy wagon or dolly which is of simple construction, inexpensive to manufacture and efficient in operation.

For other objects and for a better understanding of the invention, reference may be had to the following detailed description taken in connection with the accompanying drawing, in which Fig. 1 is a longitudinal cross-sectional view of a dolly embodying the features of the present invention.

Fig. 2 is a bottom plan view of my handy wagon.

Fig. 3 is a rear end elevational view of my handy wagon.

Fig. 4 is a top plan view.

Fig. 5 is a fragmentary view of the wagon turned up on end.

Fig. 6 is a side elevational view of my handy wagon showing the forward wheel on an elevated position and the lifting wheels engaging with the elevated location and prior to the pulling of the wagon upwardly to locate the wagon in its entirety on the elevated location.

Fig. 7 is a fragmentary and cross-sectional view taken through the universal handle connection.

Fig. 8 is a fragmentary and cross-sectional view taken generally on line 8—8 of Fig. 4 and showing a removable end board elevated to a raised position.

Fig. 9 is a fragmentary and cross-sectional view taken on line 9—9 of Fig. 1.

Fig. 10 is a cross-sectional view of a modified form of handle construction.

Fig. 11 is a fragmentary cross-sectional view illustrating a modified form of the invention wherein plural elevating wheels are located ahead of the rear supporting wheels.

Referring now to the figures, 15 represents a platform of generally triangular shape about which there is extended a sheet metal side wall 16. This side wall is open at the rear and between the ends thereof there is extended a removable end board 17. The end board is retained against outward displacement by inwardly bent ends 18 of the wall 16.

On the forward end of the platform there is mounted a plate 21 which is fixed by bolts 22. This plate 21 has a socket formation 23 adapted to receive a ball 24 on the lower end of a handle 25 having a hand grip 26 at its upper end. The handle 25 is crooked in order that it can extend forwardly over the forward end of the platform and above the top edge of the wall 16.

The bolts 22 also retain a bottom plate 27 forming a part of a caster wheel structure 28 adapted to support the forward end of the platform 15 from the ground.

At the rear of the platform and at opposite sides thereof, there are connected respectively pairs of angle members 31 adapted to depend downwardly from the bottom face of the platform 15. A shaft 32 extends through the angled members and is retained against axial displacement by projections 33 lying between angle members. The shaft 32 has rear wheels 34 on the outer ends of the same.

In order to facilitate the movement of the wagon to an elevated location, there is provided between the angled members and forwardly of the shaft 32 small wheels 35. These wheels 35 are elevated from the large wheels 34 and will at first engage the elevated location after the caster wheel 28 has been extended thereover as viewed in Fig. 6. By the wheels or rollers 35 being of small diameter and raised from the rear wheels, the elevating of the wagon will be done in steps and consequently with less effort. The rear portion of the wagon will be first raised upon wheels 35 and then upon wheels 34. The wheels 34 will be in engagement with the elevated position at a location thereon below the center axis of the wheels. In Fig. 5, it will be noted that the wagon can be tilted upon its rear end and supported as when the same is to be stored.

In Fig. 11, there is shown a modified form of the invention wherein two small wheels 37 and 38 are used. Accordingly, the rear portion of the wagon will be preliminarily elevated in two steps; first on wheels 37 and then on wheels 38 and thereafter on the wheels 34.

In Fig. 10 there is shown a modified form of grip for the handle. This grip includes a ball 41 which is attached to the end of a handle 25 by a set screw 42.

While various changes may be made in the detail construction, it shall be understood that such changes shall be within the spirit and scope of the present invention as defined by the appended claims.

I claim:

1. A handy wagon comprising an elongated platform, a caster wheel structure disposed on the forward end of the platform, elongated brackets of inverted U-form in cross section secured to the under surface of the platform at the rear end thereof near the side edges of the platform, in parallel relation to the longitudinal center of the platform and in spaced relation to each other, flanges extending outwardly of the sides of the brackets to maintain the brackets in vertical relation to the platform, the forward edges of the brackets being bevelled and wheels of small diameter journalled intermediate of said edges in elevated relation to the ground surface, an axle carrying large ground wheels journalled in the brackets, and said small wheels adapted to engage an elevation to lift the rear portion of the wagon prior to the engagement of the large ground engaging wheels, whereby to facilitate the movement of the wagon onto the elevation.

2. A handy wagon as in claim 1 wherein other small wheels are journalled in the brackets intermediate of the bevelled ends thereof forwardly of said first small wheels whereby to effect the elevation of the rear portion of the wagon prior to the engagement of the large wheels in two stairs or steps, the forwardmost small wheels first engaging the elevation.

ROCKIE M. SINGER.

REFERENCES CITED

The following references are of record in the file of this patent:

UNITED STATES PATENTS

| Number | Name | Date |
|--------|------|------|
| 349,368 | Saxton | Sept. 21, 1886 |
| 710,845 | Cummins | Oct. 7, 1902 |
| 1,198,001 | Best | Sept. 12, 1916 |
| 1,310,028 | Mahan et al. | July 15, 1919 |
| 1,477,444 | Lazear | Dec. 11, 1923 |
| 1,579,388 | Palmer | Apr. 6, 1926 |
| 1,807,913 | Hollowood | June 2, 1931 |
| 1,849,028 | Robinson | Mar. 8, 1932 |
| 2,032,532 | Eck | Mar. 3, 1936 |
| 2,234,925 | Hastings, Jr. | Mar. 11, 1941 |